US012801332B2

(12) United States Patent
Zheng et al.

(10) Patent No.: US 12,801,332 B2
(45) Date of Patent: Nov. 17, 2026

(54) SIGNAL TRANSMISSION METHOD AND APPARATUS, AND LED CONTROL APPARATUS AND LED DISPLAY MODULE

(71) Applicant: SHENZHEN LEYARD OPTO-ELECTRONIC CO., LTD., Shenzhen (CN)

(72) Inventors: Jinlong Zheng, Shenzhen (CN); Hailei Zhang, Shenzhen (CN); Yabin Liu, Shenzhen (CN)

(73) Assignee: SHENZHEN LEYARD OPTO-ELECTRONIC CO., LTD., Shenzhen (CN)

( * ) Notice: Subject to any disclaimer, the term of this patent is extended or adjusted under 35 U.S.C. 154(b) by 26 days.

(21) Appl. No.: 18/870,669

(22) PCT Filed: Aug. 23, 2023

(86) PCT No.: PCT/CN2023/114501
§ 371 (c)(1),
(2) Date: Nov. 30, 2024

(87) PCT Pub. No.: WO2024/041575
PCT Pub. Date: Feb. 29, 2024

(65) Prior Publication Data

US 2025/0370699 A1 Dec. 4, 2025

(30) Foreign Application Priority Data

Aug. 23, 2022 (CN) ......................... 202211013290.4
Aug. 23, 2022 (CN) ......................... 202222225764.3

(51) Int. Cl.
*G06F 3/147* (2006.01)
*G06F 1/18* (2006.01)
*G09G 3/32* (2016.01)

(52) U.S. Cl.
CPC .............. *G06F 3/147* (2013.01); *G06F 1/189* (2013.01); *G09G 3/32* (2013.01); *G09G 2330/02* (2013.01)

(58) Field of Classification Search
CPC ........... G06F 3/147; G06F 1/189; G09G 3/32; G09G 2330/02
See application file for complete search history.

(56) References Cited

U.S. PATENT DOCUMENTS 6,084,578 A 7/2000 Hiroki
10,248,372 B2 * 4/2019 Hall ...................... G06F 3/1438
(Continued)

FOREIGN PATENT DOCUMENTS

CN 201878122 U 6/2011
CN 104834620 A 8/2015
(Continued)

OTHER PUBLICATIONS

Anonymous et al:"Keyestudio 8*8 LED Dot Matrix Module(Address Select)for Arduino", Nov. 27, 2020 (Nov. 27, 2020), pp. 1-8.
(Continued)

*Primary Examiner* — Dmitriy Bolotin
(74) *Attorney, Agent, or Firm* — The Sun IP Law

(57) ABSTRACT

A signal transmission method and apparatus, and a Light Emitting Diode (LED) control apparatus and an LED display module. The method includes: acquiring first signals in one-to-one correspondence with multiplexing pins, where the multiplexing pins are located on a power supply signal shared input connector, each multiplexing pin is configured to connect at least two control circuits in an LED lamp panel, and each first signal is configured to drive first sub-circuits in the at least two control circuits connected to the corresponding multiplexing pin (S202); and respectively transmitting, by means of the multiplexing pins, the first signals
(Continued)

in one-to-one correspondence to the first sub-circuits (S204). The technical problem in the related art of complex lines for driving an LED display module is solved.

20 Claims, 6 Drawing Sheets

(56) References Cited

U.S. PATENT DOCUMENTS

| | | | | |
|---|---|---|---|---|
| 10,373,535 | B2 * | 8/2019 | Hall | F21K 9/20 |
| 10,706,770 | B2 * | 7/2020 | Hall | G06F 3/1446 |
| 11,189,220 | B1 | 11/2021 | Zheng | |
| 11,288,028 | B2 * | 3/2022 | Miles | G02F 1/133308 |
| 2004/0100459 | A1 * | 5/2004 | Wu | G09G 3/32<br>345/204 |
| 2016/0188506 | A1 * | 6/2016 | Wang | G06F 13/4282<br>710/106 |
| 2023/0215398 | A1 * | 7/2023 | Lee | G06F 3/1446<br>345/1.3 |
| 2024/0012512 | A1 * | 1/2024 | Fang | G06F 3/04166 |

FOREIGN PATENT DOCUMENTS

| | | | |
|---|---|---|---|
| CN | 108322964 | A | 7/2018 |
| CN | 210986071 | U | 7/2020 |
| CN | 111681621 | A | 9/2020 |
| CN | 111694784 | A | 9/2020 |
| CN | 112486349 | A | 3/2021 |
| CN | 113490040 | A | 10/2021 |
| CN | 214336295 | U | 10/2021 |
| CN | 215868585 | U | 2/2022 |
| CN | 216849193 | U | 6/2022 |
| CN | 115294920 | A | 11/2022 |
| CN | 218568407 | U | 3/2023 |

OTHER PUBLICATIONS

The first office action of counterpart EP application No. 23856663 issued on Jun. 25, 2025.

The first office action of counterpart CN application No. 2022110132904 issued on Sep. 4, 2024.

The search report of PCT application No. PCT/CN2023/114501 issue on Oct. 24, 2023.

Bhushan Chaudhary, "What is 74HC157 Multiplexer : PinConfiguration & Its Working" issued on Aug. 27, 2022 in Knowledge Base.

The second office action of counterpart EP application No. 23856663.2 issued on May 18, 2026.

* cited by examiner

SIGNAL TRANSMISSION METHOD AND APPARATUS, AND LED CONTROL APPARATUS AND LED DISPLAY MODULE

This application claims priority to Chinese Patent Application No. 202211013290.4 filed on Aug. 23, 2022 and entitled "Signal Transmission Method and Apparatus, and LED Control Apparatus and Computer Device", and Chinese Patent Application No. 202222225764.3 filed on Aug. 23, 2022 and entitled "LED Display Module and LED Display Apparatus having LED Display Module therein", the disclosures of which are hereby incorporated by reference in their entirety.

TECHNICAL FIELD

The present disclosure relates to the field of display devices, and specifically to a signal transmission method and apparatus, and a Light Emitting Diode (LED) control apparatus and a computer device.

BACKGROUND

In the related art, an LED display module is provided with two input interfaces, which are a power supply input interface and a signal input interface. A power supply box of an LED display apparatus is also correspondingly provided with a power supply output interface and a signal output interface. A power supply transmission line and a signal transmission line are connected between the power supply box and the LED display module, so as to supply power for the LED display module and transmit display data.

One LED display apparatus includes a plurality of LED display modules, and each LED display module is connected to one power supply transmission line and one signal transmission line, resulting in more and cluttered lines between the LED display modules and the power supply box, such that when an operator assembles the LED display apparatus, each LED display module needs to be separately connected to the power supply transmission line and the signal transmission line, causing operations to be relatively complex.

In view of the above problems, no effective solution has been proposed yet.

SUMMARY

Embodiments of the present disclosure provide a signal transmission method and apparatus, and an LED control apparatus and an LED display module, so as to at least solve the technical problem in the related art of complex lines for driving an LED display module.

One aspect of an embodiment of the present disclosure provides a signal transmission method, including: acquiring first signals in one-to-one correspondence with multiplexing pins, where the multiplexing pins are located on a power supply signal shared input connector, each multiplexing pin is configured to connect at least two control circuits in an LED lamp panel, and each first signal is configured to drive first sub-circuits in the at least two control circuits connected to the corresponding multiplexing pin; and respectively transmitting, by means of the multiplexing pins, the first signals in one-to-one correspondence to the first sub-circuits.

As at least one alternative embodiment, the method further includes: acquiring second signals in one-to-one correspondence with the multiplexing pins, where each second signal is configured to drive second sub-circuits in the at least two control circuits connected to the corresponding multiplexing pins, and the second sub-circuits are different from the first sub-circuits; and respectively transmitting, by means of the multiplexing pins, the second signals in one-to-one correspondence to the second sub-circuits.

As at least one alternative embodiment, acquiring the second signals in one-to-one correspondence with the multiplexing pins includes: receiving a switching instruction, where the switching instruction is configured to indicate to switch from transmission of the first signals by means of the multiplexing pins to transmission of the second signals by means of the multiplexing pins; and in response to the switching instruction, acquiring the second signals in one-to-one correspondence with the multiplexing pins.

As at least one alternative embodiment, the switching instruction includes a correction instruction; the correction instruction is configured to indicate to switch from transmission of display signals by means of the multiplexing pins to transmission of correction circuit drive signals by means of the multiplexing pins; and the first signals include the display signals, and the second signals include the correction circuit drive signals.

As at least one alternative embodiment, the switching instruction includes a display instruction; the display instruction is configured to indicate to indicate switching from transmission of correction circuit drive signals by means of the multiplexing pins to transmission of display signals by means of the multiplexing pins; and the first signals include the correction circuit drive signals, and the second signals include the display signals.

As at least one alternative embodiment, the switching instruction includes an encrypted communication instruction; the encrypted communication instruction is configured to indicate to indicate to switch from transmission of encrypted communication signals by means of the multiplexing pins to transmission of display signals by means of the multiplexing pins; and the first signals include the encrypted communication signals, and the second signals include the display signals.

Another aspect of an embodiment of the present disclosure further provides a signal transmission apparatus, including: an acquisition module, configured to acquire first signals in one-to-one correspondence with multiplexing pins, where the multiplexing pins are located on a power supply signal shared input connector, each multiplexing pin is configured to connect at least two control circuits in an LED lamp panel, and each first signal is configured to drive first sub-circuits in the at least two control circuits connected to the corresponding multiplexing pin; and a transmission module, configured to respectively transmit, by means of the multiplexing pins, the first signals in one-to-one correspondence to the first sub-circuits.

Another aspect of an embodiment of the present disclosure further provides an LED control apparatus, including a processor and a power supply signal shared input connector. The power supply signal shared input connector includes multiplexing pins, and each multiplexing pin is configured to connect at least two control circuits in an LED lamp panel; and the processor is connected with the multiplexing pins and configured to run a program, and when the program is executed, any one of the signal transmission methods is implemented.

Still another aspect of an embodiment of the present disclosure further provides a non-volatile storage medium. The non-volatile storage medium includes a stored program. The program, when being run, controls a device in which the non-volatile storage medium is located to execute any one of the signal transmission methods.

Yet another aspect of an embodiment of the present disclosure further provides a computer device. The computer device includes a memory and a processor. The memory is configured to store a program, and the processor is configured to run the program stored in the memory; and when the program is run, any one of the signal transmission methods is executed.

Yet another aspect of an embodiment of the present disclosure further provides an LED display module, including: an LED lamp panel, provided with a control circuit, where the control circuit includes a plurality of multiplexing pin sub-circuits and a plurality of other sub-circuits; and a power supply signal shared input connector, disposed on a rear side of the LED lamp panel, and including a plurality of multiplexing pins and a plurality of other pins. The plurality of other pins are correspondingly connected with the plurality of other sub-circuits on a one-to-one basis, each multiplexing pin is connected to at least two multiplexing pin sub-circuits.

As at least one alternative embodiment, the plurality of multiplexing pins include a first pin; the plurality of multiplexing pin sub-circuits include a first display circuit and a first logic timing signal decoding circuit; and the first display circuit and the first logic timing signal decoding circuit are arranged in parallel and connected with the first pin.

As at least one alternative embodiment, the plurality of multiplexing pins include a second pin; the plurality of multiplexing pin sub-circuits include a second display circuit and a first correction circuit; and the second display circuit and the first correction circuit are arranged in parallel and connected with the second pin.

As at least one alternative embodiment, the plurality of multiplexing pins include a third pin; the plurality of multiplexing pin sub-circuits include a third display circuit and a second logic timing signal decoding circuit; and the third display circuit and the second logic timing signal decoding circuit are arranged in parallel and connected with the third pin.

As at least one alternative embodiment, the plurality of multiplexing pins include a fourth pin; the plurality of multiplexing pin sub-circuits include a fourth display circuit, a second correction circuit, and an encrypted circuit; and the fourth display circuit, the second correction circuit, and the encrypted circuit are arranged in parallel and connected with the fourth pin.

As at least one alternative embodiment, the power supply signal shared input connector further includes a housing portion; one portion of each of other pins is disposed inside the housing portion, and the other portion is exposed from the housing portion; and one portion of each multiplexing pin is disposed inside the housing portion, and the other portion is exposed from the housing portion.

As at least one alternative embodiment, the housing portion is provided with a socket configured to be mated, in a plugging manner, with a plug of a power supply signal shared transmission line.

As at least one alternative embodiment, an inner sidewall of the socket is provided with a fool-proofing recess.

As at least one alternative embodiment, the housing portion is also provided with an anti-separating recess, and the anti-separating recess is spaced apart from the socket.

Yet another aspect of an embodiment of the present disclosure further provides an LED display apparatus, including a box body, an LED display module disposed on a front side of the box body, a power supply box disposed in the box body or on a rear side of the box body, and a power supply signal shared transmission line connected between the LED display module and the power supply box. The LED display module is the LED display module described above.

In the embodiments of the present disclosure, a power supply input interface and a signal input interface are integrated together to form the power supply signal shared input connector, such that only one power supply signal shared transmission line is required between the power supply box and each LED display module, so as to achieve power supply and signal transmission at the same time, the number of connection lines between the power supply box and each LED display module is reduced by half, and the number of connection lines in the entire LED display apparatus is also reduced by half, thereby simplifying line connections inside the LED display apparatus, and thus making an operator assemble the LED display apparatus easily. Furthermore, by means of the multiplexing of the pins, by controlling the multiplexing pins on the power supply signal shared input connector to respectively provide signals to the at least two control circuits in the LED lamp panel, the signals required by corresponding different control circuits at different moments are respectively transmitted to the LED lamp panel in the LED display module by the same multiplexing pin, such that the purpose of reducing the number of lines required for driving the LED display module is achieved, and the technical effect of simplifying wiring required for the LED display module is achieved, thereby solving the technical problem in the related art of complex lines for driving an LED display module.

BRIEF DESCRIPTION OF THE DRAWINGS

The drawings described herein are used to provide a further understanding of the present disclosure, and constitute a part of the present disclosure. The exemplary embodiments of the present disclosure and the description thereof are used to explain the present disclosure, but do not constitute improper limitations to the present disclosure. In the drawings.

Figure 1:
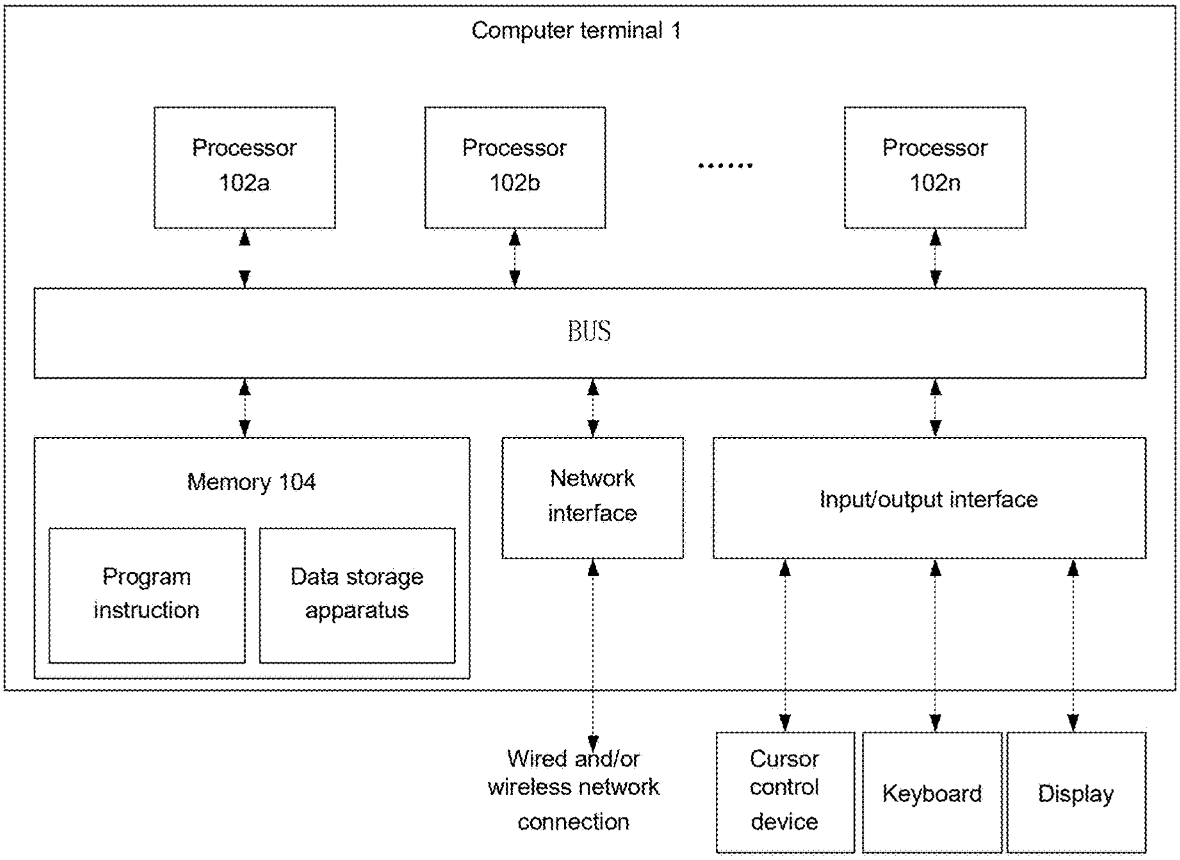
FIG. 1 is a block diagram of a hardware structure of a computer terminal configured to implement a signal transmission method.

The above accompanying drawings include the following reference numerals:

10. LED display module; 20. Power supply signal shared input connector; 21. Housing portion; 211. Socket.

212. Fool-proofing recess; 213. Anti-separating recess; 30. Power supply signal shared transmission line; 31. Plug; 40. Power supply box.

DETAILED DESCRIPTION OF THE EMBODIMENTS

In order to enable those skilled in the art to better understand the solutions of the present disclosure, the technical solutions in the embodiments of the present disclosure will be clearly and completely described below in combination with the drawings in the embodiments of the present disclosure. It is apparent that the described embodiments are only part of the embodiments of the present disclosure, not all the embodiments. All other embodiments obtained by those of ordinary skill in the art on the basis of the embodiments in the present disclosure without creative work shall fall within the scope of protection of the present disclosure.

It is to be noted that terms "first", "second" and the like in the description, claims and the above mentioned drawings of the present disclosure are used for distinguishing similar objects rather than describing a specified sequence or a precedence order. It should be understood that the data used in such a way may be exchanged where appropriate, in order that the examples of the present disclosure described here can be implemented in an order other than those illustrated or described herein. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

An embodiment of the present disclosure provides a signal transmission method embodiment. It is to be noted that the steps shown in the flowchart of the accompanying drawings may be executed in a computer system, such as a set of computer-executable instructions, and although a logical sequence is shown in the flowchart, in some cases, the steps shown or described may be executed in a different order than here.

The method embodiment provided in Embodiment I of the present disclosure may be executed in a mobile terminal, a computer terminal or a similar computing apparatus. FIG. 1 is a block diagram of a hardware structure of a computer terminal configured to implement a signal transmission method. As shown in FIG. 1, the computer terminal 1 may include one or more (102*a*, 102*b*, . . . , 102*n* are used for illustration) processors (the processor may include, but is not limited to, a processing apparatus such as a microprocessor MCU or a programmable logic device FPGA), and a memory 104 for storing data. In addition, the computer terminal may further include a display, an input/output interface (I/O interface), a Universal Serial Bus (USB) port (which may be included as one of the ports of the bus), a network interface, a power supply and/or a camera. Those skilled in the art may understand that the structure shown in FIG. 1 is only a schematic diagram, which does not limit the structure of the above electronic apparatus. For example, the computer terminal 1 may further include more or less components than those shown in FIG. 1, or have a different configuration from that shown in FIG. 1.

It should be noted that one or more of the above processors and/or other data processing circuits may generally be referred to herein as "data processing circuits". The data processing circuits may be embodied in whole or in part in software, hardware, firmware, or any other combination. In addition, the data processing circuit may be a single independent processing module, or fully or partially incorporated into any of the other components of the computer terminal 1. The data processing circuit acts as a processor control (for example, selection of variable resistor terminal paths connected to the interface), as mentioned in this embodiment of the present disclosure.

The memory 104 may be configured to store software programs of application software and modules, such as a program instruction/data storage apparatus corresponding to a signal transmission method in the embodiments of the present disclosure. The processor executes various function applications and data processing by running the software programs and modules stored in the memory 104, that is, the above signal transmission method is implemented. The memory 104 may include a high-speed random access memory, and may further include a non-volatile memory, such as one or more magnetic disk memory apparatuses, a flash memory device, or other non-volatile solid-state memory devices. In some embodiments, the memory 104 may further include memories remotely disposed relative to the processor. The remote memories may be connected to the computer terminal 1 by using a network. Examples of the above network include, but are not limited to, the Internet, an intranet, a local area network, a mobile communication network, and a combination thereof.

The display may be, for example, a touch screen Liquid Crystal Display (LCD) that enables a user to interact with a user interface of the computer terminal 1.

Through the application of the technical solution of this embodiment, a power supply input interface and a signal input interface in an LED control apparatus may be integrated together to form a power supply signal shared input connector, such that only one power supply signal shared transmission line is required between the LED control apparatus and each LED display module, so as to achieve power supply and signal transmission at the same time, the number of connection lines between the LED control apparatus and each LED display module is reduced by half, and the pins required for transmitting power supplies and data are also reduced, thereby simplifying line connections inside the LED display apparatus, and thus making an operator assemble the LED display apparatus easily.

Figure 2:
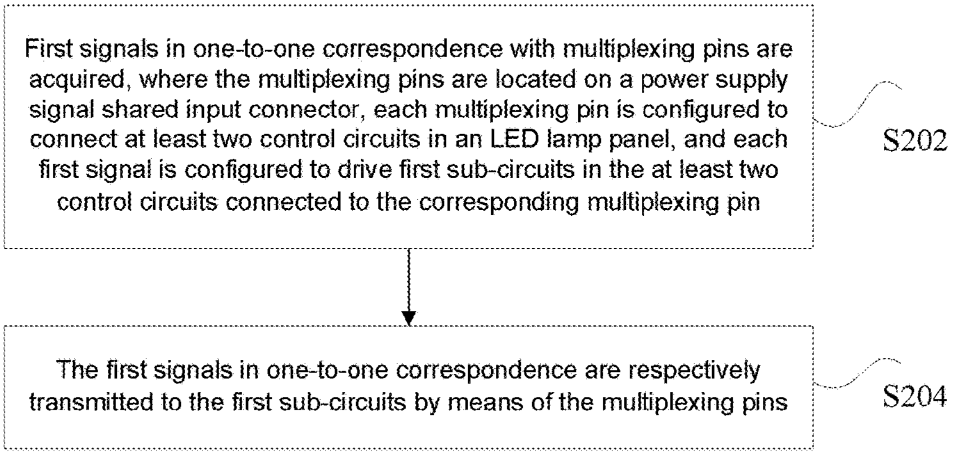
FIG. 2 is a schematic flowchart of a signal transmission method according to an embodiment of the present disclosure.

FIG. 2 is a schematic flowchart of a signal transmission method according to an embodiment of the present disclosure. As shown in FIG. 2, the method includes the following steps.

At S202, first signals in one-to-one correspondence with multiplexing pins are acquired, where the multiplexing pins are located on a power supply signal shared input connector, each multiplexing pin is configured to connect at least two control circuits in an LED lamp panel, and each first signal is configured to drive first sub-circuits in the at least two control circuits connected to the corresponding multiplexing pin.

It is to be noted that, the power supply signal shared input connector in S202 may be a connector located on an LED display apparatus, and the LED display apparatus may be referred to as a signal control tower or a signal control box. The power supply signal shared input connector may be a transmission connector shared by power supply signals, and the power supply signal shared input connector may be connected with an LED display module by means of a transmission line.

As at least one alternative embodiment, since a type-C wire is able to perform electric energy transmission and is able to also perform signal transmission, in the embodiments of the present disclosure, the type-C wire may be used as a power supply signal shared transmission line, so as to be connected with the power supply signal shared input connector. In the related art, an LED module uses an interface having 26 pins for signal transmission, and uses an interface having 4 pins for electric energy transmission, while a type-C interface only has 24 pins, such that in this embodiment, each multiplexing pin is connected with control circuits on at least two LED lamp panels, different control circuits that do not need to operate at the same time are connected to the same multiplexing pin, so as to realize the multiplexing of the pins, and even if the number of the pines is reduced, a requirement of normal display of the LED display module can still be met.

It is to be noted that, each control circuit in the LED display module is only connected with one multiplexing pin.

At S204, the first signals in one-to-one correspondence are respectively transmitted to the first sub-circuits by means of the multiplexing pins. After the first sub-circuit receives the first signal, the first sub-circuit may be driven itself according to the first signal.

As an optional embodiment, the signal transmission method may further include the following steps: acquiring second signals in one-to-one correspondence with the multiplexing pins, where each second signal is configured to drive second sub-circuits in the at least two control circuits connected to the corresponding multiplexing pins, and the second sub-circuits are different from the first sub-circuits; and respectively transmitting, by means of the multiplexing pins, the second signals in one-to-one correspondence to the second sub-circuits.

An LED control apparatus may transmit different signals to the LED lamp panel by means of the same multiplexing pin at different moments, and different signals are configured to drive different control circuits corresponding to the multiplexing pin. Through the above steps, by means of the multiplexing of the pins, by controlling the multiplexing pins on the power supply signal shared input connector to respectively provide signals to the at least two control circuits in the LED lamp panel, the signals required by corresponding different control circuits at different moments are respectively transmitted to the LED lamp panel in the LED display module by the same multiplexing pin, such that the purpose of reducing the number of lines required for driving the LED display module is achieved, and the technical effect of simplifying wiring required for the LED display module is achieved, thereby solving the technical problem in the related art of complex lines for driving an LED display module.

As an optional embodiment, acquiring the second signals in one-to-one correspondence with the multiplexing pins may include the following steps: receiving a switching instruction, where the switching instruction is configured to indicate that transmission of the first signals by means of the multiplexing pins is switched to transmission of the second signals by means of the multiplexing pins; and in response to the switching instruction, acquiring the second signals in one-to-one correspondence with the multiplexing pins.

In this embodiment, the switching instruction may be configured to change an operating mode of the LED display module. In order to change the operating mode of the LED display module, the switching instruction changes a type of the signal sent to by LED lamp panel by the LED control apparatus by means of the multiplexing pin, and different control circuits in the LED lamp panel are driven by means of different signal types, so as to change an operating mode of the lamp panel in the LED display module.

As an optional embodiment, the switching instruction may include a correction instruction; the correction instruction is configured to indicate that transmission of display signals by means of the multiplexing pins is switched to transmission of correction circuit drive signals by means of the multiplexing pins; and the first signals include the display signals, and the second signals include the correction circuit drive signals.

By means of the correction instruction, the LED display module may be instructed to switch from a display state to a correction state; in the state switching process, the multiplexing pin configured to transmit the display signal may stop transmitting the display signal, and be switched to transmit the correction circuit drive signal for driving a correction circuit, such that transmission of various types of signals may be completed without additionally adding wires between the LED control apparatus and the LED module.

As an optional embodiment, the switching instruction may include a display instruction; the display instruction is configured to indicate that transmission of the correction circuit drive signals by means of the multiplexing pins is switched to transmission of the display signals by means of the multiplexing pins; and the first signals include the correction circuit drive signals, and the second signals include the display signals.

By means of the display instruction, the LED display module may be instructed to switch from the correction state to the display state; in the state switching process, the multiplexing pin configured to transmit the correction circuit drive signal may stop transmitting the correction circuit drive signal, and be switched to transmit a display signal for controlling lamp leads in a display module to display an image, such that transmission of various types of signals may be completed without additionally adding the wires between the LED control apparatus and the LED module.

As an optional embodiment, the switching instruction may further include an encrypted communication instruction; the encrypted communication instruction is configured to indicate that transmission of encrypted communication signals by means of the multiplexing pins is switched to transmission of display signals by means of the multiplexing pins; and the first signals include the encrypted communication signals, and the second signals include the display signals.

As at least one alternative embodiment, the encrypted communication instruction may be used for performing matching verification between the LED display module and the LED control apparatus. For example, an MCU in the LED display module may verify whether the type of the LED control apparatus currently accessed matches the type of the LED display module, or whether the LED control apparatus and the LED display module are from a same manufacturer; and if the LED control apparatus does not pass the matching verification, the LED control apparatus currently accessed is refused to establish a connection and achieve an operation response. In this case, the LED control apparatus may achieve a communication first with an encrypted circuit in the LED display module by means of the first signal; after identities are verified with each other, the encrypted communication instruction is generated; and the encrypted communication instruction instructs the LED control apparatus to switch to a normal operating mode, so as to send the display signal to the LED lamp panel.

As at least one alternative embodiment, after the LED display module is powered on, the LED display module is provided with an individual MCU; the LED control apparatus may transmit the encrypted communication signal to the MCU by means of the multiplexing pin corresponding to the encrypted communication signal; and the MCU responds to the signal, then generates an encrypted key, and sends same to the LED control apparatus. After solving and obtaining a result, the LED control apparatus returns the result to the MCU by means of the multiplexing pin, and the MCU determines, based on the result, whether the control box is the LED control apparatus matching the LED display module. If the match is successful, the MCU may provide feedback to the LED control apparatus, and the LED control apparatus generates the encrypted communication instruction based on this, as to instruct a signal transmitted in the multiplexing pin to switch from the first signal to the second signal, so as to change the application of the multiplexing pin.

It is to be noted that, in this embodiment, a correction circuit may operate in a debugging stage of the LED display apparatus, and generally, the LED display apparatus may need to be debugged once, not before each display; and the encrypted circuit operates before each display, after the LED display apparatus is powered on, the encrypted circuit operates first, and the LED display apparatus is able to normally display a frame after a communication is successful.

Figure 3:
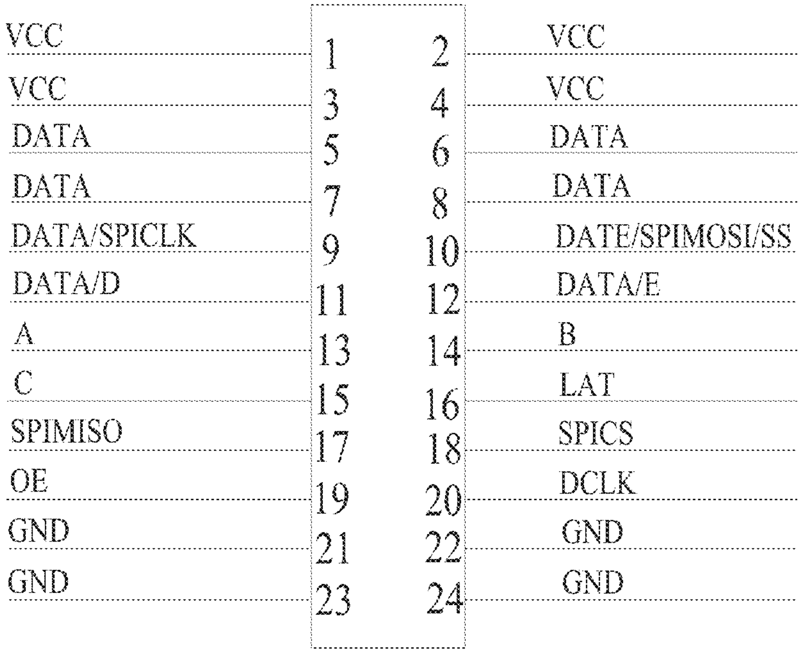
FIG. 3 is a schematic wiring diagram of a multiplexing pin of a power supply signal shared input connector according to an optional embodiment of the present disclosure.

FIG. 3 is a schematic wiring diagram of a multiplexing pin of a power supply signal shared input connector according to an optional embodiment of the present disclosure. As shown in FIG. 3, a plurality of multiplexing pins may be a pin 9, a pin 10, a pin 11, and a pin 12 in the figure. Each multiplexing pin may be configured to connect the correction circuit and a display circuit of the LED display module, and the correction circuit and the display circuit connected by each multiplexing pin are arranged in parallel. The multiplexing pin may be configured to transmit a column display signal (data) to the display circuit, and different display circuits correspondingly connected to different multiplexing pins control different display regions on the LED lamp panel. For example, in installation and debugging stages of the LED display apparatus, the display of each LED display module may be corrected; in the debugging stage, the operation of the correction circuit is triggered manually by a host computer or control software, and in this case, the display circuit transmits a low level, i.e., the display region controlled by the display circuit is not illuminated; and after correction is completed, the display signal is transmitted to the display circuit by means of the multiplexing pin to cause the display circuit to operate and recover a function of displaying data.

As at least one alternative embodiment, in this optional embodiment, the correction circuit may include a logic timing signal decoding circuit, and the correction circuit drive signal may include a row display signal. Before the LED display module normally operates, the LED control apparatus may transmit the signal by means of the multiplexing pin to select the display circuit in the LED display module or the logic timing signal decoding circuit to operate.

As shown in FIG. 3, in this optional embodiment, the multiplexing pin 10 may also simultaneously correspond to the display circuit, correction circuit, and encrypted circuit in the LED display module, and the display circuit, the correction circuit, and the encrypted circuit are arranged in parallel and connected with the multiplexing pin 10. The display circuit corresponding to the multiplexing pin 10 transmits the column display signal (data); when the encrypted circuit operates, the MCU in the LED display module communicates with the MCU of a receiving card in the LED control apparatus by means of the encrypted circuit; as long as the communication is successful, the LED display module is able to display normally; after the match is successful, the encrypted circuit stops operating, and the display circuit operates and recovers the function of transmitting display data (DATA); and if the communication fails, it indicates that a system in the LED control apparatus does not successfully match the LED display module, and the system needs to be changed.

In this optional embodiment, in addition to the 4 pins described above, the other pins in the power supply signal shared input connector are respectively connected with one sub-circuit, and these sub-circuits are all conventional circuits in the art. For example, as shown in FIG. 3, pins 1, 2, 3, and 4 are connected with a VCC circuit of a power supply circuit; pins 21, 22, 23, and 24 are connected with a GND circuit of the power supply circuit; pins 5, 6, 7, and 8 are connected with the display circuit; pins 13, 14, and 15 are connected with the logic timing signal decoding circuit; pins 17 and 18 are connected with the correction circuit; and pins 16, 19, and 20 are connected with a logic timing signal circuit.

Figure 4:
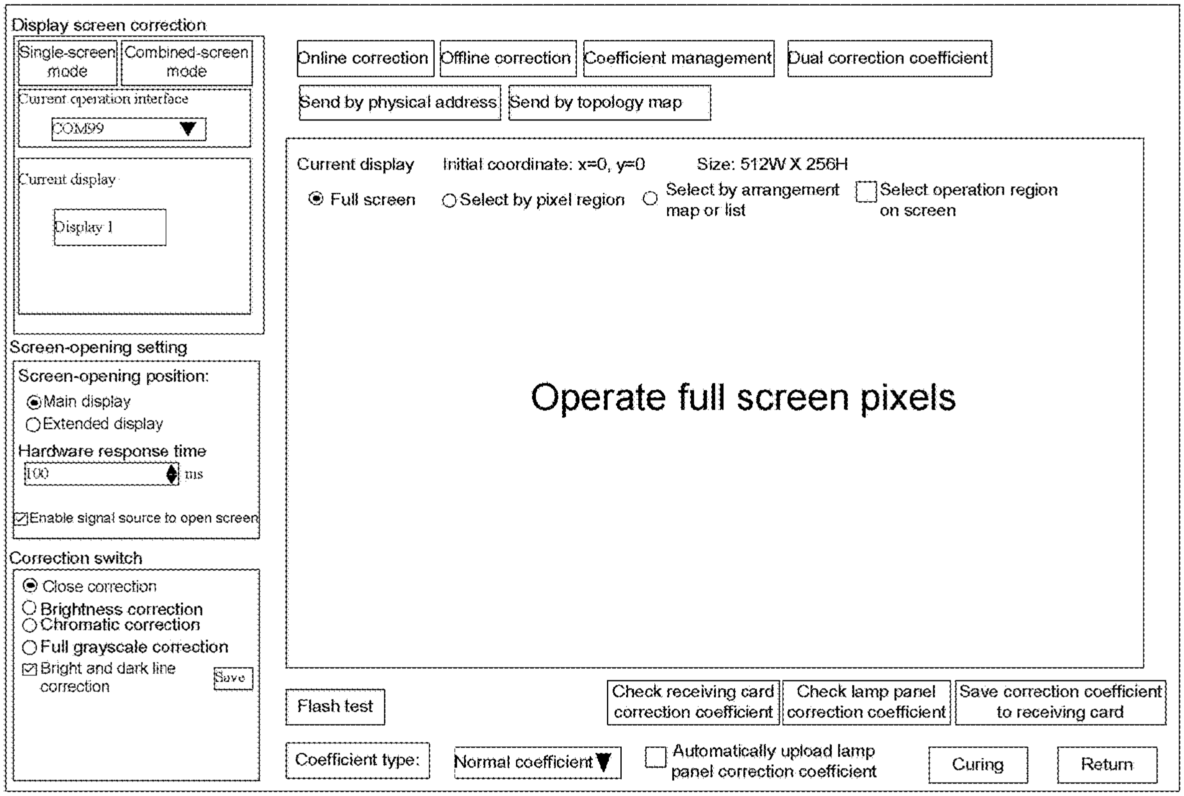
FIG. 4 is a schematic diagram of a correction window of a host computer according to an optional embodiment of the present disclosure.

FIG. 4 is a schematic diagram of a correction window of a host computer according to an optional embodiment of the present disclosure. As shown in FIG. 4, when a user operates the host computer to correct the LED display module, the correction instruction may be sent by means of the correction window, and the correction instruction is used for indicating switching from transmission of the display signals by means of the multiplexing pins to transmission of the correction circuit drive signals by means of the multiplexing pins. After the LED control apparatus receives the correction instructions, the application of the multiplexing pins is switched, signal data transmitted in the multiplexing pins is switched from the display signals to the correction circuit drive signals, so as to drive the correction circuit in the LED display module to perform a correction operation.

Figure 5:
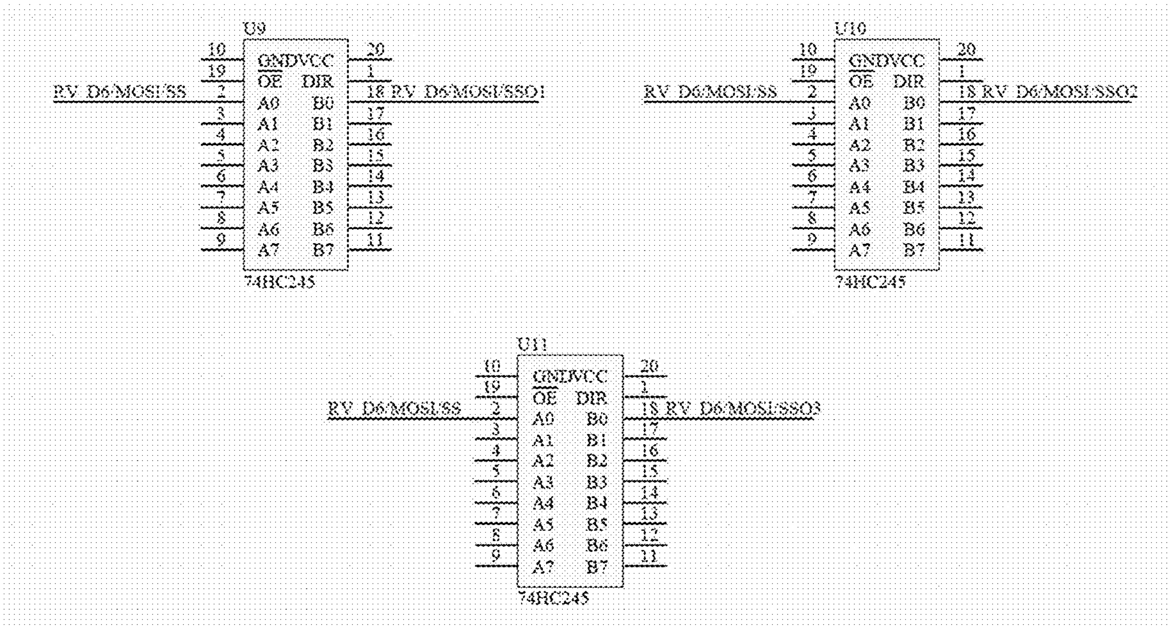
FIG. 5 is a schematic diagram of a signal processing chip of an LED display module according to an optional embodiment of the present disclosure.

FIG. 5 is a schematic diagram of a signal processing chip of an LED display module according to an optional embodiment of the present disclosure. As shown in FIG. 5, the LED display module has at least three signal processing chips U9, U10, and U11; and the three signal processing chips are respectively connected to three multiplexing pins, and configured to amplify and stabilize waveforms for signals transmitted by different multiplexing pins. As at least one alternative embodiment, three processed signals may be outputted after amplification is performed by means of three different signal processing chips, and the processed signals may be respectively connected to different control circuits. For example, an output of the chip U9 is connected to an SDI pin of a constant current drive chip in the LED display module; an output of the chip U10 is connected to an MOSI pin of a flash memory chip to drive the correction circuit; an output of the chip U11 is connected to an I/O port of an MCU drive chip; and the processed signals respectively trigger, in cooperation with software and other on-site signals, different circuits to ensure that the LED display module may operate normally.

As at least one alternative embodiment, the step may include the following processes: when the LED display module is powered on for operation each time, the output of the chip U11 is first connected to a circuit of the MCU; when a display screen is powered on for use each time, the MCU and a receiving card circuit communicate with each other to perform handshake matching, in a handshake matching process, in addition to the timing of the signal, the rest of the signals are all set to a low level, and the rest of the circuits do not operate all; and a next circuit is started if handshake is successful. After a configuration file is automatically loaded in the LED display module, a chip U9 connection circuit starts to normally light a module, in this case, other signals of circuits U10 and U11 all pull down the chips, resulting in ineffectiveness, and the process differs in timing and does not interfere with other circuits. When correction data is required, host computer software sends the correction instruction, the display signals are all closed, and in this case, the control circuit, i.e., the correction circuit, linked with the chip U10 is driven and functions properly.

It is to be noted that, for ease of simple description, the foregoing method embodiments are all expressed as a series of action combinations, but those skilled in the art should know that the present disclosure is not limited by the described action sequence, as according to the present disclosure, some steps may be performed in other sequences or simultaneously. Then, those skilled in the art should also know that the embodiments described in the specification are all preferred embodiments, and the actions and modules involved are not necessarily required by the present disclosure.

From the above descriptions about the implementation modes, those skilled in the art may clearly know that the signal transmission method according to the foregoing embodiments may be implemented in a manner of combining software and a necessary universal hardware platform, and of course, may also be implemented through hardware, but the former is a preferred implementation mode under many circumstances. Based on such an understanding, the technical solutions of the present disclosure substantially or parts making contributions to the conventional art may be embodied in form of software product, and the computer software product is stored in a storage medium (for example, a ROM/RAM), a magnetic disk and an optical disk), including a plurality of instructions configured to enable a terminal device (which may be a mobile phone, a computer, a server, a network device, or the like) to execute the method in each embodiment of the present disclosure.

Figure 6:
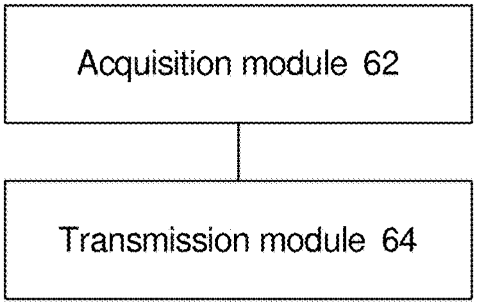
FIG. 6 is a block structural diagram of a signal transmission apparatus according to an embodiment of the present disclosure.

An embodiment of the present disclosure further provides a signal transmission apparatus for implementing the signal transmission method. FIG. 6 is a block structural diagram of a signal transmission apparatus according to an embodiment of the present disclosure. As shown in FIG. 6, the signal transmission apparatus includes an acquisition module 62 and a transmission module 64. The signal transmission apparatus is described below.

The acquisition module 62 is configured to acquire first signals in one-to-one correspondence with multiplexing pins. The multiplexing pins are located on a power supply signal shared input connector, each multiplexing pin is configured to connect at least two control circuits in an LED lamp panel, and each first signal is configured to drive first sub-circuits in the at least two control circuits connected to the corresponding multiplexing pin.

The transmission module 64 is connected to the acquisition module 62 and configured to respectively transmit, by means of the multiplexing pins, the first signals in one-to-one correspondence to the first sub-circuits.

It is to be noted here that, the acquisition module 62 and the transmission module 64 correspond to S202 to S204 in the embodiments, examples and application scenarios implemented by the two modules and the corresponding steps are the same, but are not limited to the contents disclosed in the embodiments. It is to be noted that, the above modules are used as a part of the apparatus, and may be operated in a computer terminal 1 provided in the embodiments.

Figure 7:
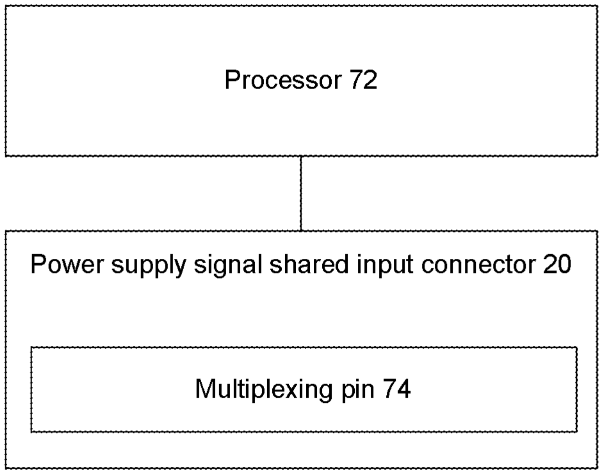
FIG. 7 is a block structural diagram of an LED control apparatus according to an embodiment of the present disclosure.

FIG. 7 is a block structural diagram of an LED control apparatus according to an embodiment of the present disclosure. As shown in FIG. 7, the LED control apparatus includes a processor 72 and a power supply signal shared input connector 20. The LED control apparatus is described below.

The power supply signal shared input connector includes multiplexing pins 74, and each multiplexing pin 74 is configured to connect at least two control circuits in an LED lamp panel; and the processor 72 is connected with the multiplexing pin 74 and configured to run a program, and when the program is executed, any one of the signal transmission methods is implemented.

An embodiment of the present disclosure may further provide an LED display module.

Figure 8:
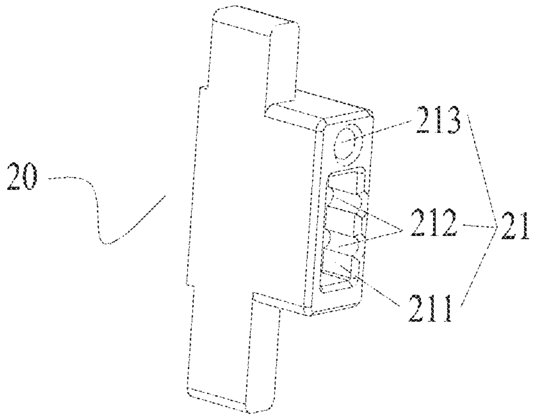
FIG. 8 is a schematic diagram of a three-dimensional structure of a power supply signal shared input connector of an LED display module embodiment according to the present disclosure.
Figure 9:
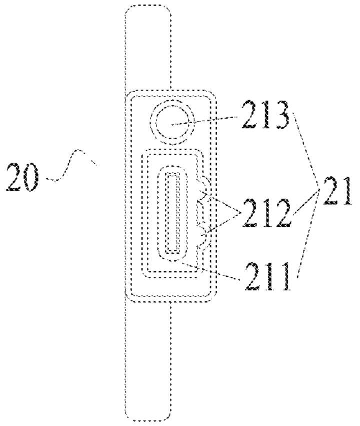
FIG. 9 is a schematic front view of a structure of the power supply signal shared input connector of FIG. 8.

As shown in FIGS. 8 to 9, the LED display module in this embodiment includes an LED lamp panel and a power supply signal shared input connector 20. The LED lamp panel is provided with a control circuit, and the control circuit includes a plurality of multiplexing pin sub-circuits and a plurality of other sub-circuits. The power supply signal shared input connector 20 is disposed on a rear side of the LED lamp panel, and including a plurality of multiplexing pins and a plurality of other pins. The plurality of other pins are correspondingly connected with the plurality of other sub-circuits on a one-to-one basis, each multiplexing pin is connected to at least two multiplexing pin sub-circuits.

Through the application of the technical solution of this embodiment, a power supply input interface and a signal input interface are integrated together to form the power supply signal shared input connector 20, such that only one power supply signal shared transmission line 30 is required between the power supply box 40 and each LED display module, so as to achieve power supply and signal transmission at the same time, the number of connection lines between the power supply box 40 and each LED display module is reduced by half, and the number of connection lines in the entire LED display apparatus is also reduced by half, thereby simplifying line connections inside the LED display apparatus, and thus making an operator assemble the LED display apparatus easily. Therefore, the technical solution in this embodiment can effectively solve the problem in the related art of complex operations during the assembling of an LED display apparatus.

Since a type-C wire is able to perform electric energy transmission and can also perform signal transmission, in this embodiment, the type-C wire is used as the power supply signal shared transmission line 30, so as to be connected with the power supply signal shared input connector 20. In the related art, an LED module uses an interface having 26 pins for signal transmission, and uses an interface having 4 pins for electric energy transmission, while a type-C interface only has 24 pins, such that in this embodiment, each multiplexing pin is connected with at least two multiplexing pin sub-circuits, different multiplexing pin sub-circuits that do not need to operate at the same time are connected to the same multiplexing pin, so as to realize the multiplexing of the connection pins, and even if the number of the pines is reduced, a requirement of normal display of the LED display module can still be met.

It is to be noted that, each of other sub-circuits is merely connected with one of other pins, and each multiplexing pin sub-circuit is also merely connected with one multiplexing pin.

In this embodiment, the multiplexing pin sub-circuit may include a first sub-circuit and a second sub-circuit in the signal transmission method embodiment.

As at least one alternative embodiment, as shown in FIG. 3, in this embodiment, the plurality of multiplexing pins include a first pin; the plurality of multiplexing pin sub-circuits include a first display circuit and a first logic timing signal decoding circuit; and the first display circuit and the first logic timing signal decoding circuit are arranged in parallel and connected with the first pin. The first display circuit transmits a column display signal (data), the first logic timing signal decoding circuit transmits a row display signal, and before the LED display apparatus operates normally, whether to operate the first display circuit or the first logic timing signal decoding circuit may be selected. For example, the first pin is the pin 11 in FIG. 3.

As shown in FIG. 3, in this embodiment, the plurality of multiplexing pins include a second pin; the plurality of multiplexing pin sub-circuits include a second display circuit and a first correction circuit; and the second display circuit and the first correction circuit are arranged in parallel and connected with the second pin. The second display circuit transmits the column display signal (data), and the second display circuit and the first display circuit control different display regions on the LED lamp panel. For example, in installation and debugging stages of the LED display apparatus, the display of each LED display module needs to be corrected; in the debugging stage, the operation of the first correction circuit is triggered manually by a host computer or control software, and in this case, the second display circuit transmits a low level, i.e., the display region controlled by the second display circuit is not illuminated; and after correction is completed, the second display circuit is operated, and recovers a function of displaying data. For example, the second pin is the pin 9 in FIG. 3.

As shown in FIG. 3, in this embodiment, the plurality of multiplexing pins include a third pin; the plurality of multiplexing pin sub-circuits include a third display circuit and a second logic timing signal decoding circuit; and the third display circuit and the second logic timing signal decoding circuit are arranged in parallel and connected with the third pin. The third display circuit transmits the column display signal (data), the second logic timing signal decoding circuit transmits the row display signal. Before the LED display apparatus operates normally, whether to operate the third display circuit or the second logic timing signal decoding circuit may be selected. For example, the third pin is the pin 12 in FIG. 3.

As shown in FIG. 3, in this embodiment, the plurality of multiplexing pins include a fourth pin; the plurality of multiplexing pin sub-circuits include a fourth display circuit, a second correction circuit, and an encrypted circuit; and the fourth display circuit, the second correction circuit, and the encrypted circuit are arranged in parallel and connected with the fourth pin. The fourth display circuit transmits the column display signal (data); when the encrypted circuit operates, the MCU in the LED display module communicates with the MCU of a receiving card in the LED display apparatus by means of the encrypted circuit; as long as the communication is successful, the LED display module is able to display normally; after the match is successful, the encrypted circuit stops operating, and the fourth display circuit operates and recovers the function of transmitting display data (DATA); and if the communication fails, it indicates that a system does not match successfully, and the system needs to be changed. It is to be noted that, in this embodiment, the first correction circuit and the second correction circuit may operate in a debugging stage of an LED display device, and generally, the LED display apparatus may need to be debugged once, not before each display; and the encrypted circuit operates before each display, after the LED display apparatus is powered on, the encrypted circuit operates first, and the LED display apparatus is able to normally display a frame after a communication is successful. For example, the fourth pin is the pin 10 in FIG. 3.

In this embodiment, in addition to the four pins described above, the plurality of other pins in the power supply signal shared input connector 20 are respectively connected with one sub-circuit, and these sub-circuits are all conventional circuits in the art. For example, as shown in FIG. 8, pins 1, 2, 3, and 4 are connected with a VCC circuit of a power supply circuit; pins 21, 22, 23, and 24 are connected with a GND circuit of the power supply circuit; pins 5, 6, 7, and 8 are connected with the display circuit; pins 13, 14, and 15 are connected with the logic timing signal decoding circuit; pins 17 and 18 are connected with the correction circuit; and pins 16, 19, and 20 are connected with a logic timing signal circuit.

As shown in FIGS. 8 and 9, the power supply signal shared input connector 20 further includes a housing portion 21; one portion of each of other pins is disposed inside the housing portion 21, and the other portion is exposed from the housing portion 21; and one portion of each multiplexing pin is disposed inside the housing portion 21, and the other portion is exposed from the housing portion 21. The portions of other pins and portions of the multiplexing pins located inside the housing portion 21 are connected with the power supply signal shared transmission line 30, and the portions of other pins and portions of the multiplexing pins located outside the housing portion 21 are connected with various sub-circuits.

Figure 11:
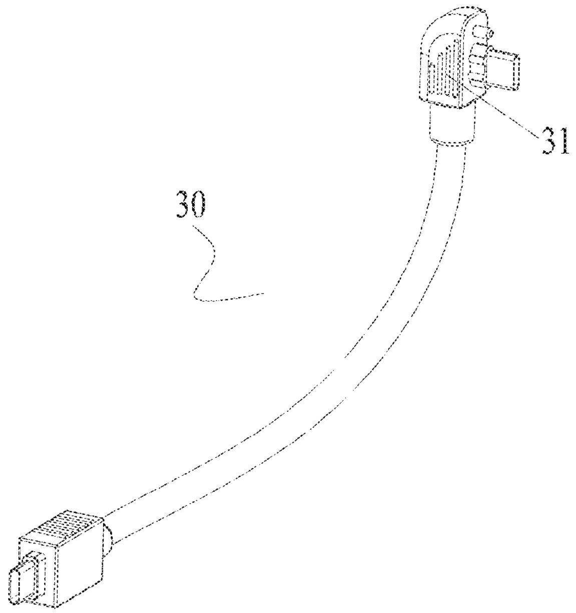
FIG. 11 is a schematic diagram of a three-dimensional structure of a power supply signal shared transmission line of the LED display apparatus of FIG. 10.

As shown in FIGS. 8, 9 and 11, the housing portion 21 is provided with a socket 211 configured to be mated, in a plugging manner, with a plug 31 of a power supply signal shared transmission line 30. The plug 31 is mated with the socket 211 in a plugging manner, so as to achieve electric energy and signal transmission between the power supply box 40 and the LED display module.

As shown in FIGS. 8, 9 and 11, an inner sidewall of the socket 211 is provided with a fool-proofing recess 212. Correspondingly, the plug 31 is also provided with a protrusion structure mated with the fool-proofing recess 212. Since each pin of the power supply signal shared input connector 20 needs to be connected with the corresponding sub-circuits, and if the plug 31 is inserted reversely, the LED display module cannot operate normally or may even be burnt, and the plug can be effectively prevented from being inserted reversely by disposing the fool-proofing recess 212.

As shown in FIGS. 8, 9 and 11, the housing portion 21 is also provided with an anti-separating recess 213, and the anti-separating recess 213 is spaced apart from the socket 211. Since the power supply signal shared transmission line 30 has a certain weight, after the LED display device is assembled, the power supply signal shared transmission line 30 pulls the plug 31 down due to its gravity action, and thus, the plug 31 is easily separated from the socket 211 during long-term use. The housing portion 21 is provided with the anti-separating recess 213, and an anti-separating protrusion inserted into the anti-separating recess 213 is correspondingly provided on the plug 31, such that the plug 31 is mated with the socket 211 in a plugging manner, and the anti-separating protrusion is mated with the anti-separating recess 213 in a plugging manner, thereby achieving an anti-pulling effect.

Figure 10:
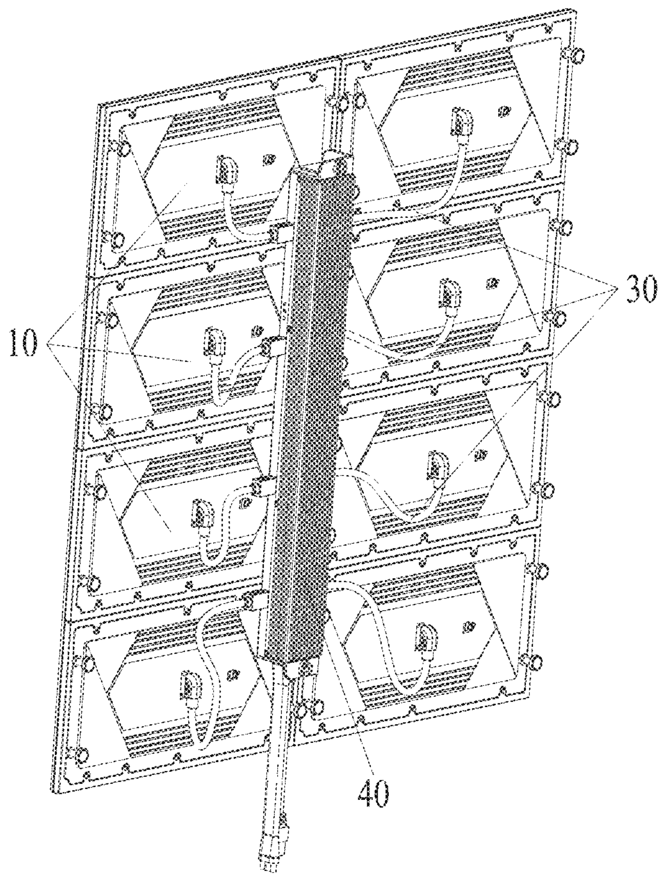
FIG. 10 is a schematic diagram of a three-dimensional structure of an LED display apparatus embodiment according to the present disclosure.

As shown in FIGS. 10 and 11, the present disclosure further provides an LED display apparatus. The LED display apparatus embodiment of the present disclosure includes a box body, an LED display module 10 disposed on a front side of the box body, a power supply box 40 disposed in the box body or on a rear side of the box body, and a power supply signal shared transmission line 30 connected between the LED display module 10 and the power supply box 40. The LED display module is the LED display module described above. The LED display module can effectively solve the problem in the related art of complex operations during the assembling of an LED display apparatus. The LED display apparatus having the LED display module also has the above advantages.

In this embodiment, the power supply box 40 includes a power supply and a control panel. The power supply and the control panel are integrated and then connected by means of one power supply signal shared output interface and the power supply signal shared transmission line 30, so as to supply power to the LED display module and transmit a control signal.

An embodiment of the present disclosure may provide a computer device. As at least one alternative embodiment, in this embodiment, the above computer device may be located in at least one network device among a plurality of network devices of a computer network. The computer device includes a memory and a processor.

The memory may be configured to store software programs and modules, such as a program instruction/module corresponding to a signal transmission method in the embodiments of the present disclosure. The processor executes various function applications and data processing by running the software programs and modules stored in the memory, i.e., implementing the above signal transmission method. The memory may include a high-speed random access memory, and may further include a non-volatile memory, such as one or more magnetic disk memory apparatuses, a flash memory device, or other non-volatile solid-state memory devices. In some examples, the memory may further include memories remotely disposed relative to the processor. The remote memories may be connected to the computer terminal by using a network. Examples of the above network include, but are not limited to, the Internet, an intranet, a local area network, a mobile communication network, and a combination thereof.

The processor may call information and application programs stored in the memory by means of a transmission apparatus, so as to execute the following steps: acquiring first signals in one-to-one correspondence with multiplexing pins, where the multiplexing pins are located on a power supply signal shared input connector, each multiplexing pin is configured to connect at least two control circuits in an LED lamp panel, and each first signal is configured to drive first sub-circuits in the at least two control circuits connected to the corresponding multiplexing pin; and respectively transmitting, by means of the multiplexing pins, the first signals in one-to-one correspondence to the first sub-circuits.

As at least one alternative embodiment, the processor may also execute program codes of the following steps: acquiring second signals in one-to-one correspondence with the multiplexing pins, where each second signal is configured to drive second sub-circuits in the at least two control circuits connected to the corresponding multiplexing pins, and the second sub-circuits are different from the first sub-circuits; and respectively transmitting, by means of the multiplexing pins, the second signals in one-to-one correspondence to the second sub-circuits.

As at least one alternative embodiment, the processor may also execute program codes of the following steps: receiving a switching instruction, where the switching instruction is configured to indicate that transmission of the first signals by means of the multiplexing pins is switched to transmission of the second signals by means of the multiplexing pins; and in response to the switching instruction, acquiring the second signals in one-to-one correspondence with the multiplexing pins.

As at least one alternative embodiment, the processor may also execute program codes of the following steps. The switching instruction includes a correction instruction; the correction instruction is configured to indicate that transmission of display signals by means of the multiplexing pins is switched to transmission of correction circuit drive signals by means of the multiplexing pins; and the first signals include the display signals, and the second signals include the correction circuit drive signals.

As at least one alternative embodiment, the processor may also execute program codes of the following steps. The switching instruction includes a display instruction; the display instruction is configured to indicate that transmission of the correction circuit drive signals by means of the multiplexing pins is switched to transmission of the display signals by means of the multiplexing pins; and the first signals include the correction circuit drive signals, and the second signals include the display signals.

As at least one alternative embodiment, the processor may also execute program codes of the following steps. The switching instruction includes an encrypted communication instruction; the encrypted communication instruction is configured to indicate that transmission of encrypted communication signals by means of the multiplexing pins is switched to transmission of display signals by means of the multiplexing pins; and the first signals include the encrypted communication signals, and the second signals include the display signals.

Those of ordinary skill in the art may understand that, all or part of the steps in the various methods of the above embodiments may be completed by instructing hardware related to the terminal device through a program. The program may be stored in a non-volatile storage medium, and the storage medium may include a flash disk, a Read-Only Memory (ROM), a Random Access Memory (RAM), a magnetic disk, or an optical disk.

An embodiment of the present disclosure further provides a non-volatile storage medium. As at least one alternative embodiment, in this embodiment, the non-volatile storage medium may be configured to save program codes executed by the signal transmission method provided in the embodiments.

As at least one alternative embodiment, in this embodiment, the non-volatile storage medium may be located in any computer terminal in a computer terminal group in a computer network, or located in any mobile terminal in a mobile terminal group.

As at least one alternative embodiment, in this embodiment, the non-volatile storage medium is configured to store the program codes for executing the following steps: acquiring first signals in one-to-one correspondence with multiplexing pins, where the multiplexing pins are located on a power supply signal shared input connector, each multiplexing pin is configured to connect at least two control circuits in an LED lamp panel, and each first signal is configured to drive first sub-circuits in the at least two control circuits connected to the corresponding multiplexing pin; and respectively transmitting, by means of the multiplexing pins, the first signals in one-to-one correspondence to the first sub-circuits.

As at least one alternative embodiment, in this embodiment, the non-volatile storage medium is configured to store the program codes for executing the following steps: acquiring second signals in one-to-one correspondence with the multiplexing pins, where each second signal is configured to drive second sub-circuits in the at least two control circuits connected to the corresponding multiplexing pins, and the second sub-circuits are different from the first sub-circuits; and respectively transmitting, by means of the multiplexing pins, the second signals in one-to-one correspondence to the second sub-circuits.

As at least one alternative embodiment, in this embodiment, the non-volatile storage medium is configured to store the program codes for executing the following steps: receiving a switching instruction, where the switching instruction is configured to indicate that transmission of the first signals by means of the multiplexing pins is switched to transmission of the second signals by means of the multiplexing pins; and in response to the switching instruction, acquiring the second signals in one-to-one correspondence with the multiplexing pins.

As at least one alternative embodiment, in this embodiment, the non-volatile storage medium is configured to store the program codes for executing the following steps. The switching instruction includes a correction instruction; the correction instruction is configured to indicate that transmission of display signals by means of the multiplexing pins is switched to transmission of correction circuit drive signals by means of the multiplexing pins; and the first signals include the display signals, and the second signals include the correction circuit drive signals.

As at least one alternative embodiment, in this embodiment, the non-volatile storage medium is configured to store the program codes for executing the following steps. The switching instruction includes a display instruction; the display instruction is configured to indicate that transmission of the correction circuit drive signals by means of the multiplexing pins is switched to transmission of the display signals by means of the multiplexing pins; and the first signals comprise the correction circuit drive signals, and the second signals include the display signals.

As at least one alternative embodiment, in this embodiment, the non-volatile storage medium is configured to store the program codes for executing the following steps. The switching instruction includes an encrypted communication instruction; the encrypted communication instruction is configured to indicate that transmission of encrypted communication signals by means of the multiplexing pins is switched to transmission of display signals by means of the multiplexing pins; and the first signals include the encrypted communication signals, and the second signals include the display signals.

The serial numbers of the foregoing embodiments of the present disclosure are merely for description, and do not represent the superiority or inferiority of the embodiments.

In the above embodiments of the present disclosure, the description of the embodiments has its own focus. For parts that are not described in detail in a certain embodiment, reference may be made to related descriptions of other embodiments.

In the several embodiments provided in the present disclosure, it should be understood that, the disclosed technical content can be implemented in other ways. The apparatus embodiments described above are merely illustrative. For example, the division of units may be a logical function division, and there may be other divisions in actual implementation. For example, a plurality of units or components may be combined or integrated into another system, or some features can be ignored, or not implemented. In addition, the displayed or discussed mutual coupling or direct coupling or communication connection may be indirect coupling or communication connection through some interfaces, units or modules, and may be in electrical or other forms.

The units described as separate components may or may not be physically separated. The components displayed as units may or may not be physical units, that is, the components may be located in one place, or may be distributed on the plurality of units. Part or all of the units may be selected according to actual requirements to achieve the purposes of the solutions of this embodiment.

In addition, the functional units in the various embodiments of the present disclosure may be integrated into one processing unit, or each unit may exist alone physically, or two or more than two units may be integrated into one unit. The above integrated unit can be implemented in the form of hardware, or can be implemented in the form of a software functional unit.

If the integrated unit is implemented in the form of the software functional unit and sold or used as an independent product, it may be stored in the non-volatile storage medium. Based on this understanding, the technical solutions of the present disclosure essentially or the parts that contribute to the prior art, all or part of the technical solutions can be embodied in the form of a software product. The computer software product is stored in a storage medium, including a plurality of instructions for causing a computer device (which may be a personal computer, a server, or a network device, and the like) to execute all or part of the steps of the method described in the various embodiments of the present disclosure. The foregoing storage medium includes a USB flash disk, a Read-Only Memory (ROM), a Random Access Memory (RAM), and various media that can store program codes, such as a mobile hard disk, a magnetic disk, or an optical disk.

The above description is merely preferred implementations of the present disclosure, and it should be noted that persons of ordinary skill in the art may also make several improvements and refinements without departing from the principle of the present disclosure, and it should not be considered that these improvements and refinements shall fall within the protection scope of the present disclosure.

INDUSTRIAL APPLICABILITY

The solutions provided in the embodiments of the present disclosure may be applied to the field of display devices. In the embodiments of the present disclosure, by means of the multiplexing of the pins, by controlling the multiplexing pins on the power supply signal shared input connector to respectively provide signals to the at least two control circuits in the LED lamp panel, the signals required by corresponding different control circuits at different moments are respectively transmitted to the LED lamp panel in the LED display module by the same multiplexing pin, such that the technical effect of simplifying wiring required for the LED display module is achieved.

What is claimed is:

1. A signal transmission method, comprising:

acquiring first signals in one-to-one correspondence with multiplexing pins, wherein the multiplexing pins are located on a power supply signal shared input connector, each multiplexing pin is configured to connect at least two control circuits in an LED lamp panel, and each first signal is configured to drive first sub-circuits in the at least two control circuits connected to a corresponding multiplexing pin; and respectively transmitting, by means of the multiplexing pins, the first signals in one-to-one correspondence to the first sub-circuits.

2. The method as claimed in claim 1, further comprising:

acquiring second signals in one-to-one correspondence with the multiplexing pins, wherein each second signal is configured to drive second sub-circuits in the at least two control circuits connected to the corresponding multiplexing pins, and the second sub-circuits are different from the first sub-circuits; and respectively transmitting, by means of the multiplexing pins, the second signals in one-to-one correspondence to the second sub-circuits.

3. The method as claimed in claim 2, wherein acquiring the second signals in one-to-one correspondence with the multiplexing pins comprises:

receiving a switching instruction, wherein the switching instruction is configured to indicate to switch from transmission of the first signals by means of the multiplexing pins to transmission of the second signals by means of the multiplexing pins; and in response to the switching instruction, acquiring the second signals in one-to-one correspondence with the multiplexing pins.

4. The method as claimed in claim 3, wherein the switching instruction comprises a correction instruction; the correction instruction is configured to indicate to switch from transmission of display signals by means of the multiplexing pins to transmission of correction circuit drive signals by means of the multiplexing pins; and the first signals comprise the display signals, and the second signals comprise the correction circuit drive signals.

5. The method as claimed in claim 3, wherein the switching instruction comprises a display instruction; the display instruction is configured to indicate to switch from transmission of correction circuit drive signals by means of the multiplexing pins to transmission of display signals by means of the multiplexing pins; and the first signals comprise the correction circuit drive signals, and the second signals comprises the display signals.

6. The method as claimed in claim 3, wherein the switching instruction comprises an encrypted communication instruction; the encrypted communication instruction is configured to indicate to switch from transmission of encrypted communication signals by means of the multiplexing pins to transmission of display signals by means of the multiplexing pins; and the first signals comprise the encrypted communication signals, and the second signals comprise the display signals.

7. An LED display module, comprising:

an LED lamp panel, provided with a control circuit, wherein the control circuit comprises a plurality of multiplexing pin sub-circuits and a plurality of other sub-circuits; and a power supply signal shared input connector, disposed on a rear side of the LED lamp panel, and comprising a plurality of multiplexing pins and a plurality of other pins, wherein the plurality of other pins are correspondingly connected with the plurality of other sub-circuits on a one-to-one basis, each multiplexing pin is connected to at least two multiplexing pin sub-circuits, and the plurality of multiplexing pins use the signal transmission method for signal transmission as follows:

acquiring first signals in one-to-one correspondence with multiplexing pins, wherein the multiplexing pins are located on a power supply signal shared input connector, each multiplexing pin is configured to connect at least two control circuits in an LED lamp panel, and each first signal is configured to drive first sub-circuits in the at least two control circuits connected to a corresponding multiplexing pin; and respectively transmitting, by means of the multiplexing pins, the first signals in one-to-one correspondence to the first sub-circuits.

8. The LED display module as claimed in claim 7, wherein the plurality of multiplexing pins comprise a first pin; the plurality of multiplexing pin sub-circuits comprise a first display circuit and a first logic timing signal decoding circuit; and the first display circuit and the first logic timing signal decoding circuit are arranged in parallel and connected with the first pin.

9. The LED display module as claimed in claim 7, wherein the plurality of multiplexing pins comprise a second pin; the plurality of multiplexing pin sub-circuits comprise a second display circuit and a first correction circuit; and the second display circuit and the first correction circuit are arranged in parallel and connected with the second pin.

10. The LED display module as claimed in claim 7, wherein the plurality of multiplexing pins comprise a third pin; the plurality of multiplexing pin sub-circuits comprise a third display circuit and a second logic timing signal decoding circuit; and the third display circuit and the second logic timing signal decoding circuit are arranged in parallel and connected with the third pin.

11. The LED display module as claimed in claim 7, wherein the plurality of multiplexing pins comprise a fourth pin; the plurality of multiplexing pin sub-circuits comprise a fourth display circuit, a second correction circuit, and an encrypted circuit; and the fourth display circuit, the second correction circuit, and the encrypted circuit are arranged in parallel and connected with the fourth pin.

12. The LED display module as claimed in claim 7, wherein the power supply signal shared input connector further comprises a housing portion; one portion of each other pin is disposed inside the housing portion, and the other portion is exposed from the housing portion; and one portion of each multiplexing pin is disposed inside the housing portion, and the other portion is exposed from the housing portion.

13. The LED display module as claimed in claim 12, wherein the housing portion is provided with a socket configured to be mated, in a plugging manner, with a plug of a power supply signal shared transmission line.

14. The LED display module as claimed in claim 13, wherein an inner sidewall of the socket is provided with a fool-proofing recess.

15. The LED display module as claimed in claim 13, wherein the housing portion is also provided with an anti-separating recess, and the anti-separating recess is spaced apart from the socket.

16. An LED display apparatus, comprising a box body, an LED display module disposed on a front side of the box body, a power supply box disposed in the box body or on a rear side of the box body, and a power supply signal shared transmission line connected between the LED display module and the power supply box, wherein the LED display module comprises:

an LED lamp panel, provided with a control circuit, wherein the control circuit comprises a plurality of multiplexing pin sub-circuits and a plurality of other sub-circuits; and a power supply signal shared input connector, disposed on a rear side of the LED lamp panel, and comprising a plurality of multiplexing pins and a plurality of other pins, wherein the plurality of other pins are correspondingly connected with the plurality of other sub-circuits on a one-to-one basis, each multiplexing pin is connected to at least two multiplexing pin sub-circuits, and the plurality of multiplexing pins use the signal transmission method for signal transmission as follows:

acquiring first signals in one-to-one correspondence with multiplexing pins, wherein the multiplexing pins are located on a power supply signal shared input connector, each multiplexing pin is configured to connect at least two control circuits in an LED lamp panel, and each first signal is configured to drive first sub-circuits in the at least two control circuits connected to a corresponding multiplexing pin; and respectively transmitting, by means of the multiplexing pins, the first signals in one-to-one correspondence to the first sub-circuits.

17. The LED display module as claimed in claim 7, wherein the plurality of multiplexing pins use the signal transmission method for signal transmission further comprising:

acquiring second signals in one-to-one correspondence with the multiplexing pins, wherein each second signal is configured to drive second sub-circuits in the at least two control circuits connected to the corresponding multiplexing pins, and the second sub-circuits are different from the first sub-circuits; and respectively transmitting, by means of the multiplexing pins, the second signals in one-to-one correspondence to the second sub-circuits.

18. The LED display module as claimed in claim 17, wherein acquiring the second signals in one-to-one correspondence with the multiplexing pins comprises:

receiving a switching instruction, wherein the switching instruction is configured to indicate to switch from transmission of the first signals by means of the multiplexing pins to transmission of the second signals by means of the multiplexing pins; and in response to the switching instruction, acquiring the second signals in one-to-one correspondence with the multiplexing pins.

19. The LED display module as claimed in claim 18, wherein the switching instruction comprises a correction instruction; the correction instruction is configured to indicate to switch from transmission of display signals by means of the multiplexing pins to transmission of correction circuit drive signals by means of the multiplexing pins; and the first signals comprise the display signals, and the second signals comprise the correction circuit drive signals.

20. The LED display module as claimed in claim 18, wherein the switching instruction comprises a display instruction; the display instruction is configured to indicate to switch from transmission of correction circuit drive signals by means of the multiplexing pins to transmission of display signals by means of the multiplexing pins; and the first signals comprise the correction circuit drive signals, and the second signals comprises the display signals.

* * * * *